United States Patent [19]

Hyde et al.

[11] Patent Number: 5,139,043
[45] Date of Patent: Aug. 18, 1992

[54] WELDABLE VAPOR VENT VALVE

[75] Inventors: James P. Hyde, Saline; Thomas J. Bryans, Plymouth, both of Mich.

[73] Assignee: Ford Motor Company, Dearborn, Mich.

[21] Appl. No.: 712,168

[22] Filed: Jun. 5, 1991

Related U.S. Application Data

[63] Continuation-in-part of Ser. No. 572,078, Aug. 24, 1990, abandoned.

[51] Int. Cl.[5] .............................................. F16K 17/36
[52] U.S. Cl. .................................... 137/43; 137/375; 137/587; 251/144
[58] Field of Search ......................... 137/43, 375, 587; 251/144

[56] References Cited

U.S. PATENT DOCUMENTS

| | | |
|---|---|---|
| 3,021,029 | 2/1963 | McKinlay . |
| 3,385,468 | 5/1968 | Fleming et al. . |
| 4,219,126 | 8/1980 | Oana . |
| 4,352,364 | 10/1982 | Orsino ........................... 137/43 |
| 4,413,804 | 11/1983 | Lanius ........................... 251/144 |
| 4,646,772 | 3/1987 | Bergonia . |
| 4,660,714 | 4/1987 | Suzuki et al. . |
| 4,694,870 | 9/1987 | Vize . |
| 4,702,268 | 10/1987 | Ambruster ........................... 137/43 X |
| 4,753,262 | 6/1988 | Bergonia . |
| 4,779,637 | 10/1988 | Ubaldi ........................... 137/43 |

*Primary Examiner*—Robert G. Nilson
*Attorney, Agent, or Firm*—Peter Abolins; Damian Porcari

[57] ABSTRACT

A roll-over vapor vent valve is provided having a mounting arrangement for weldably connecting the valve directly onto a polymeric fuel tank. The valve includes a main body casing having at least one inlet for communicating with the internal chamber of the polymeric fuel tank, an outlet for communicating with a point external to the fuel tank and a passageway which communicates with the at least one inlet and the outlet. A controlling mechanism is located within the casing for controlling fluid flow through the passageway between the at least one inlet and the outlet. The mounting arrangement is preferably integral with the main body casing and serves to weldably connect the casing to the polymeric fuel tank. The mounting arrangement may comprise an L-shaped flange which extends out from and encircles a lower portion of the main body casing to define a circumferential weld foot. Alternatively, the L-shaped flange may be bifurcated to define two circumferential weld feet.

31 Claims, 4 Drawing Sheets

FIG-7

WELDABLE VAPOR VENT VALVE

This is a continuation-in-part of application Ser. No. 572,078 filed Aug. 24, 1990, now abandoned.

BACKGROUND OF THE INVENTION

The present invention generally relates to a vapor vent valve used in combination with a fuel tank employed in an automotive vehicle and, more particularly, to a vapor vent valve capable of being welded directly onto a polymeric fuel tank employed in an automotive vehicle.

Fuel tanks employed in automotive vehicles require means for keeping the internal pressure within the fuel tanks substantially in equilibrium with atmosphere. Various conditions, such as extremes of heat and cold will affect the internal pressure within the internal chamber of a fuel tank. Likewise, as fuel is withdrawn from a tank, the internal pressure therein will also change. Vent/relief mechanisms have been employed in the prior art in order to keep the internal pressure within a tank substantially at equilibrium with atmosphere. Such a vent/valve mechanism may comprise a carbon canister where vapors from the tank are collected and eventually delivered to the engine for combustion.

The vapor vent valves employed in the vent/relief mechanisms normally include means for preventing fuel from leaking out of a tank if, for example, the vehicle travels along a very steep incline causing fuel to enter into the vapor vent valve. The means employed for preventing fuel leakage may comprise a known internal shut-off mechanism included within the vapor vent valve.

It is also known in the prior art to use fuel tanks made from polymeric materials, such as polyethylene, in automotive vehicles. Such fuel tanks are advantageous because they resist corrosion and can be easily formed having various shapes and sizes, thus permitting flexibility in their design. Further, since polymeric fuel tanks are light weight, they make the vehicles in which they are employed more fuel efficient and economical to operate Arrangements for mounting vapor vent valves onto fuel tanks are known in the prior art. One such arrangement is disclosed in U.S. Pat. No. 4,753,262, wherein an outer plastic casing of the valve is formed with external threads for threadedly connecting the valve within an opening in a fuel tank. Such a connection requires the threads to be molded within the tank wall.

SUMMARY OF THE INVENTION

The present invention provides for a vapor vent valve having a polymeric, L-shaped flange integral with the main body casing of the valve for weldably connecting the valve onto a polymeric fuel tank. The L-shaped flange extends out from and encircles the outer casing of the valve to define at least one circumferential weld foot.

In accordance with one aspect of the present invention, an improved weldable vapor vent valve adapted to be welded directly onto a polymeric fuel tank is provided and includes a main body casing having at least one inlet for communicating with the internal chamber of point external to the fuel tank and a passageway which communicates with the inlet and the outlet. Means are located within the casing for controlling fluid flow through the passageway between the inlet and the outlet. The valve further includes polymeric connecting means integral with the main body casing for weldably connecting the casing to the polymeric fuel tank.

The polymeric connecting means may comprise an L-shaped flange which extends out from and encircles the main body casing to define at least one circumferential weld foot which is substantially parallel to and spaced from the main body casing. The L-shaped flange may further be bifurcated to define two circumferential weld feet.

In a further embodiment, the connecting means may comprise an L-shaped flange which extends out from and encircles the main body casing to define one circumferential weld foot. The weld foot preferably comprises an inner portion and an outer portion.

In a modification of the further embodiment, the connecting means may comprise a bifurcated L-shaped flange which extends out from and encircles the lower portion to define first and second circumferential weld feet. The first weld foot preferably comprises a first The main body casing preferably comprises a substantially cylindrical lower portion having a first end and a second end, an end wall connected to the first end of the lower portion and a nozzle connected to the second end of the lower portion. The lower portion preferably has the inlet formed therein and the connecting means is joined thereto. The lower portion and the end wall define an inner cavity for housing the controlling means and the inner cavity defines a first portion of the passageway. The nozzle includes an opening therein which extends from a first end of the nozzle to a second end thereof. The second end of the nozzle defines the outlet and the opening defines a second portion of the passageway.

In a first embodiment, the lower portion of the main body casing, the connecting means, and the nozzle are integrally formed from a first polymeric material, such as polyethylene. The connecting means may comprise an L-shaped flange which extends out from and completely encircles the lower portion to define at least one circumferential weld foot. The L-shaped flange may further be bifurcated to define two circumferential weld feet.

In alternative embodiment, the nozzle comprises a first inner section defining the opening therein and a second outer section formed around the inner section The connecting means may comprise an L-shaped flange which extends out from and encircles the lower portion to define one circumferential weld foot having an inner weld foot and the outer section of the nozzle may be formed from a first polymeric material, such as polyethylene. The inner portion of the weld foot, the d wall, and the inner section of the nozzle may be formed from a heat and fuel resistant second polymeric material, such as nylon.

In a modification of the alternative embodiment, the connecting means comprises a bifurcated L-shaped flange which extends out from and encircles the lower portion to define first and second circumferential weld feet. The first weld foot preferably comprises a first outer portion and a second inner portion. The outer portion of the first weld foot, the second weld foot, and the outer section of the nozzle may be formed from a first polymeric material, such as polyethylene. The inner portion of the first weld foot, the cylindrical lower portion of the main body casing, the end wall, and the inner section of the nozzle may be formed from a heat and fuel resistant second polymeric material, such as nylon.

In a further modification of the alternative embodiment, the inner section is made from two pieces to assist in manufacturing and assembly of the valve. The main body casing includes an inner portion containing a socket end and a nipple end. The nipple end contains a circumferential indentation which receives a projection on the socket end. The socket and nipple ends are assembled by a press fit. The press fit connection is encased within an outer portion of the main body casing to form a secure attachment. Upstanding ribs along the exterior of the inner portion aid in securing the first polymeric material to the second polymeric material. The space between the upstanding ribs contains first polymeric material. Movement between the inner and outer portions is further constrained by the ribs.

In accordance with a second aspect of the present invention, a polymeric fuel tank assembly having a weldable vapor vent valve is provided and includes a fuel tank defining an internal chamber for containing fuel and having an outer surface with an opening therein. The fuel tank may be formed from a first polymeric material, such as polyethylene. The assembly further includes a vapor vent valve welded onto the outer surface of the fuel tank over the opening. The valve preferably comprises a main body casing having at least one inlet for communicating with the internal chamber of the fuel tank, an outlet for communicating with a point external to the fuel tank and a passageway which communicates with the inlet and the outlet. Means are located within the casing for controlling fluid flow through the passageway between the inlet and the outlet. The valve further includes polymeric connecting means integral with the main body casing for weldably connecting the casing onto the fuel tank.

The connecting means may comprise any one of the L-shaped flanges described above with respect to the first aspect of the present invention.

The main body casing preferably comprises a substantially cylindrical lower portion having a first end and a second end, an end wall connected to the first end of the lower portion, and a nozzle connected to the second end of the lower portion. The lower portion preferably has the inlet formed therein and has the connecting means joined thereto The lower portion and the end wall define an inner cavity for housing the controlling means and the inner cavity defines a first portion of the passageway. The nozzle includes an opening therein which extends from a first end of the nozzle to a second end thereof. The second end of the nozzle defines the outlet and the opening defines a second portion of the passageway.

The vapor vent valve may be ultrasonically welded onto the outer surface of the fuel tank. Alternatively, the vapor vent valve may be hot-melt welded onto the outer surface of the fuel tank.

In accordance with a third aspect of the present invention, a vapor vent valve adapted to be connected onto a fuel tank is provided and includes a main body casing having at least one inlet for communicating with the internal chamber of a polymeric fuel tank, an outlet for communicating with a point external to the fuel tank and a passageway which communicates with the inlet and said outlet. A first portion of the main body casing may be formed from a first polymeric material and a second portion of the main body casing may be formed from a second polymeric material. Means are located within the casing for controlling fluid flow through the passageway between the inlet and the outlet. The valve further includes means associated with the main body casing for connecting the casing to the fuel tank. The connecting means may be formed from the first polymeric material for weldably connecting the casing to the fuel tank.

The main body casing preferably includes a substantially cylindrical lower portion having a first end and a second end, an end wall connected the first end of the lower portion and a nozzle connected to the second end of the lower portion. The lower portion has the inlet formed therein and the connecting means is joined thereto. The lower portion and the end wall define an inner cavity for housing the controlling means and the inner cavity defines a first portion of the passageway. The nozzle comprises a first inner section and a second outer section formed around the inner section. The inner section of the nozzle defines an opening which extends from a first end of the nozzle to a second end thereof. The second end of the nozzle defines the outlet and the opening defines a second portion of the passageway.

The first portion of the main body casing preferably comprises the outer section of the nozzle and the second portion of the main body casing comprises the cylindrical lower portion, the end wall, and the inner portion of the nozzle.

The first polymeric material preferably comprises a weldable polymer, such as polyethylene, and the second polymeric material preferably comprises a heat and fuel resistant polymer, such as nylon.

In accordance with a fourth aspect of the present invention, an improved weldable vapor vent valve adapted to be welded directly onto a polymeric fuel tank is provided and includes a main body casing having at least one inlet for communicating with the internal chamber of a polymeric fuel tank, an outlet for communicating with a point external to the fuel tank and outlet. Means are located within the casing for controlling fluid flow through the passageway between the inlet and the outlet. The valve further includes an L-shaped flange connector integral with the main body casing which extends out from and encircles the casing to define one circumferential weld foot for weldably connecting the casing to the polymeric fuel tank. The weld foot is preferably formed from a polymeric material.

In accordance with a fifth aspect of the present invention, an improved weldable vapor vent valve adapted to be welded directly onto a polymeric fuel tank is provided and includes a main body casing having at least one inlet for communicating with the internal chamber of a polymeric fuel tank, an outlet for communicating with a point external to the fuel tank and a passageway which communicates with the inlet and the outlet. Means are located within the casing for controlling fluid flow through the passageway between the inlet and the outlet. The valve further includes a bifurcated L-shaped flange connector integral with the main body casing which extends out from and encircles the casing to define two circumferential weld feet for weldably connecting the preferably formed from a polymeric material.

In accordance with a sixth aspect of the present invention, an improved weldable vapor vent valve adapted to be welded directly onto a polymeric fuel tank is provided and includes a main body casing having at least one inlet for communicating with the internal chamber of a polymeric fuel tank, an outlet for communicating with a point external to the fuel tank and a passageway which communicates with the inlet and the outlet. Means are located within the casing for controlling fluid flow through the passageway between the inlet and the outlet. The valve further includes an L-shaped flange connector which extends out from and encircles the main body casing to define one circumferential weld foot for weldably connecting the casing to the polymeric fuel tank. The weld foot has an outer portion formed from a first polymeric material and an inner portion formed from a second polymeric material.

In accordance with a seventh aspect of the present invention, an improved weldable vapor vent valve adapted to be welded directly onto a polymeric fuel tank is provided and includes a main body casing having at least one inlet for communicating with the internal chamber of a polymeric fuel tank, an outlet for communicating with a point external to the fuel tank and a passageway which communicates with the inlet and the outlet. Means are located within the casing for controlling fluid flow through the passageway between the inlet and the outlet. The valve further includes a bifurcated L-shaped flange connector which extends out from and encircles the main body casing to define two circumferential weld feet for weldably connecting the casing to the polymeric fuel tank. The first weld foot has a first outer portion formed from a first polymeric material and a second inner portion formed from a second polymeric material.

Accordingly, it is one object of this invention to provide an improved vapor vent valve for a fuel tank and that is easy to manufacture and assembly having a advantages will be apparent from the following description, the accompanying drawings and the appended claims.

DETAILED DESCRIPTION OF THE PREFERRED EMBODIMENT

Figure 1:
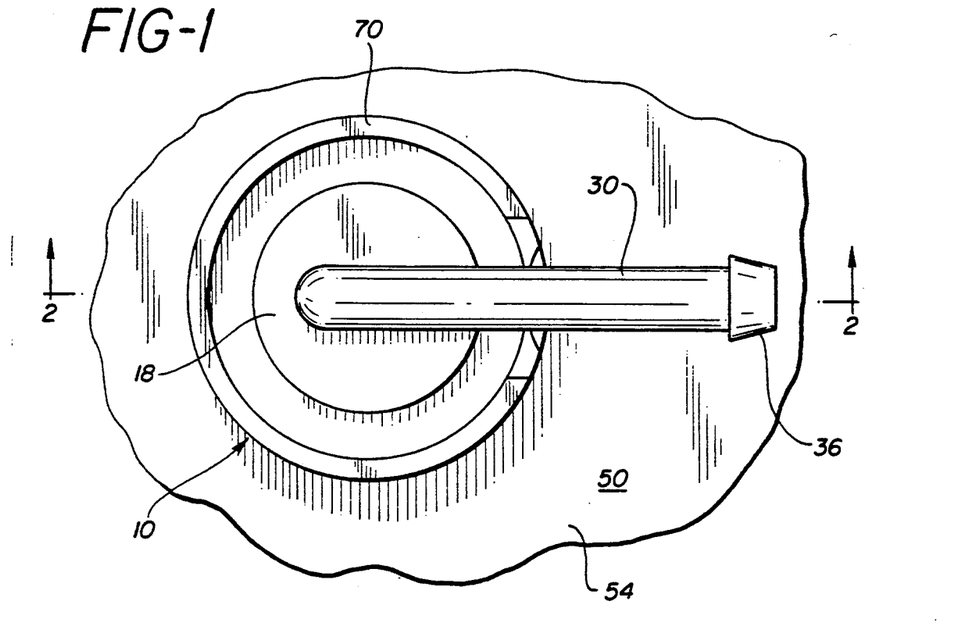
FIG. 1 is a top plan view of a first embodiment of the vapor vent valve of the present invention shown connected to a polymeric fuel tank.
Figure 2:
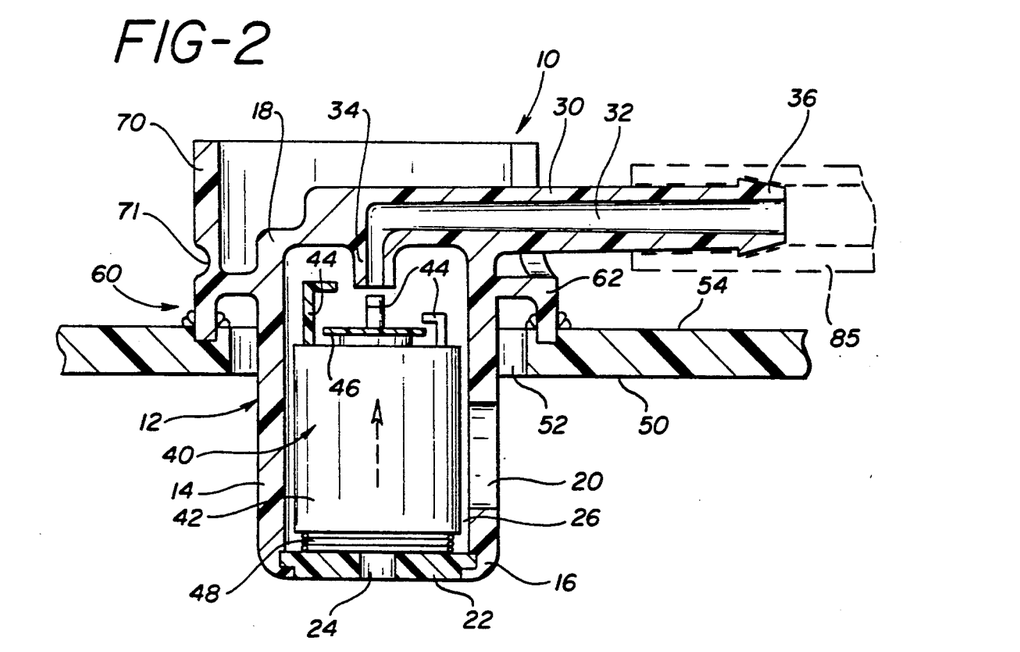
FIG. 2 is a cross-sectional view of the first embodiment of the vapor vent valve of FIG. 1 taken along section line 2—2.

Referring to FIGS. 1 and 2, a first embodiment of the vapor vent valve of the present invention, generally designated by the reference numeral 10, is illustrated attached to a polymeric fuel tank 50. The valve 10 is located within an opening 52, best shown is FIG. 2, formed in the fuel tank 50. The present invention is intended for use in a motor vehicle that would use the fuel form tank 50 in an engine. The fuel tank 50 defines an internal chamber for containing fuel and has an outer surface 54 with the opening 52 formed therein. The polymeric material from which the fuel tank 50 is made preferably comprises a weldable polymer, such as polyethylene.

The vapor vent valve 10, as best shown in FIG. 2, comprises a main body casing 12 having a substantially cylindrical lower portion 14. The lower portion 14 includes a first, bottom end 16 and second, upper end 18. The lower portion 14 further includes a first inlet 20 formed therein which permits the main body casing 12 to communicate with the upper portion or vapor space of the internal chamber of the fuel tank 50.

An end wall 22 is connected to the first end 16 of the lower portion 14 of the main body casing 12. The end wall 22 is preferably formed with a second inlet 24 which further permits the main body casing 12 to communicate with the internal chamber of the fuel tank 50. The end wall 22 may be attached to the lower portion 14 of the main body casing 12 by heat roll forming the first end 16 of the lower portion 14 onto the end wall first end 16 of the lower portion 14 by employing a cold roll forming process, an ultrasonic welding process, a heat staking process, whereby the two parts are fusion welded to one another, or the like type process. As will be discussed in further detail below, the end wall 22 and the lower portion 14 define an inner cavity 26 for housing a controlling means 40 which serves to control fluid flow between the internal chamber of the fuel tank 50 and a point external to the fuel tank 50.

Figure 4:
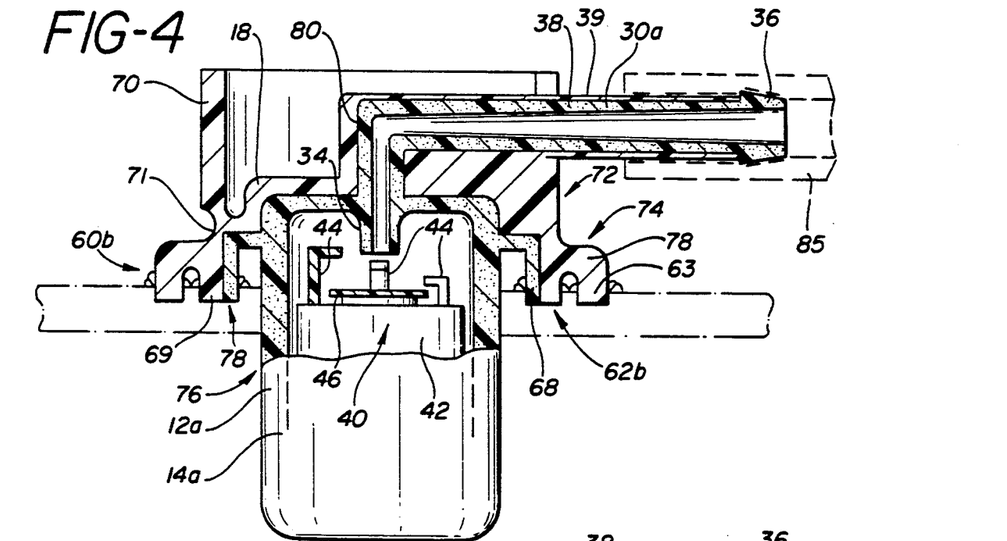
FIG. 4 is a side view, partially in section, of a second embodiment of the vapor vent valve of the present invention.

The main body casing 12 further comprises a nozzle 30 joined at the second end 18 of the lower portion 14. The nozzle 30 includes an opening 32 therein which extends from a first end 34 of the nozzle 30 to a second end 36 thereof. The first end 34 of the nozzle 30 communicates with the inner cavity 26 of the main body casing 12 while the second end 36 of the nozzle 30 defines an outlet for the valve 10 which permits the same to communicate with a point external to the fuel tank 10. As is known in the art, in order to prevent uncontrolled escape of vapors to atmosphere, a conduit, shown for example in broken line at 85 in FIGS. 2 and 4, is placed over the second end 36 of the nozzle 30. Connected to the opposite end of the conduit 85 is a carbon canister (not shown) where the vapors are collected and eventually delivered to the engine for combustion.

The main body casing 12 forms a passageway between the internal chamber of the fuel tank 50 and a point external to the fuel tank 50. The inner cavity 26 of the main body casing 12 forms a first portion of the passageway while the opening 32 in the nozzle 30 defines a second portion of the passageway.

As set forth above, the controlling means 40 is housed within the inner cavity 26 and serves to control 20 and 24 and the second end 36 of the nozzle 30. The controlling means 40 employed within the valve of the present invention is substantially similar to the one described in U.S. Pat. No. 4,753,262, the disclosure of which is incorporated herein by reference. Briefly, the controlling means 40 includes a float body 42 having fingers 44 attached at an upper end thereof. Located between the float body 42 and the end wall 22 is a compression spring 48 which applies an upwardly directed force upon the float body 42. The controlling means 40 further comprises a shut-off element or disc 46 which is located in the space between the fingers 44.

The controlling means 40 is designed to allow the internal chamber of the tank 50 to be normally vented to a point external to the fuel tank 50. As discussed above, the point external to the fuel tank 50 preferably is a cannister which collects the vapors and subsequently delivers them to the engine for combustion. If fuel enters into the valve 10 through one of the inlets 20 and 24, due to vehicle incline or fuel slosh within the tank 50, the float body 42 will move toward the first end 34 of the nozzle 30 forcing disc 46 to close off the opening 32 in the nozzle 30. If the fuel level subsequently falls below the level of the valve 10, the float will fall to its initial position, as shown in FIG. 2, and the fingers 44 will pull the disc 46 from the first end of the nozzle 34 and reopen the passageway through the valve 10.

The valve 10 further includes connecting means 60, preferably integral with the lower portion 14 of the main body casing 12. The connecting means 60 serves to weldably connect the valve 10 to the polymeric fuel tank 50. The connecting means 60, as shown in FIG. 2, may comprise a single L-shaped flange which extends out from and encircles the lower portion 14 to define a circumferential weld foot 62. Preferably, the weld foot 62 is made from the same polymeric material as the fuel tank 50, in this instance polyethylene, in order to insure that a strong cohesive bond is created between the two when they are welded together. The weld foot 62 may be made integral with the lower portion 14 by being molded together with the same. Alternatively, the connecting means 60 may be formed as a separate element from the lower portion 14 and made integral with the same by either being welded thereto or bonded thereto by an adhesive.

The single weld foot 62, and hence the valve 10, may be welded onto the fuel tank 50 by employing a heat Teflon (trademark), on opposite sides thereof. The platen is first placed between the valve 10 and the fuel tank 50 to heat both parts. After both parts have been heated, the platen is removed and pressure is applied to the valve 10 so that the weld foot 62 is pressed into the upper surface 54 of the tank 50. As the weld foot is pressed into the upper surface 54 of the tank 50, a weld and weld bead forms between the upper surface 54 and the weld foot 62, thereby creating a mechanical as well as a chemical bond between the weld foot 62 and the tank 50. As a result, the valve 10 is connected and sealed to the tank 50. Alternatively, the weld foot 62 and the fuel tank 50 may be welded together by any welding process known in the art, such as an ultrasonic welding process.

The valve 10 may also include an upper Protective ring 70 which may be formed integral with the connecting means 60 and the main body casing 12, as shown valve 10 if the same is knocked or hit as the tank, having the valve already secured thereto, is decked or placed into the vehicle during its manufacture. The protective ring 70 preferably includes a circumferential notch 71 at its base which allows the protective ring 70 to fail or break off if knocked or hit before any of the remaining portions of the valve 10 fail.

Figure 3:
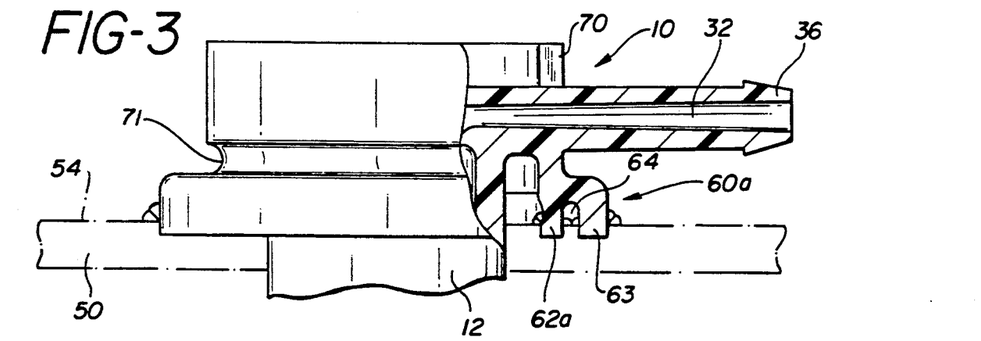
FIG. 3 is a partial side view, partially in section, of a modification of the first embodiment of the vapor vent valve of the present invention.

Another embodiment of the invention is illustrated in FIG. 3. This embodiment is similar to the one shown in FIGS. 1 and 2, except that the connecting means 60a has been modified so that the L-shaped flange is bifurcated to define two circumferential weld feet 62a and 63 having a gap 64 formed therebetween. The two weld feet 62a and 63 are preferably made from the same polymeric material as the fuel tank 50, in this case polyethylene. The two weld feet 62a and 63 are each welded onto the upper surface 54 of the fuel tank 50 in a manner as described above. It has been found that by employing two weld feet 62a and 63 to connect the valve 10 and the fuel tank 50 together, the strength of the connection is increased.

The two feet 62a and 63 are formed with the gap 64 therebetween in order to improve the respective weld between each weld foot 62a and 63 and the tank 50. This is because, as pressure is applied to the valve 10 to connect the same to the tank 50, the material at the base of each weld foot 62a and 63 is permitted to flow outwardly and bond over a broader portion of the outer surface 54 of the fuel tank 50.

A further embodiment of the invention is shown in FIG. 4. This embodiment is similar to the one shown in FIG. 3, except that the main body casing 12a and the connecting means 60b each comprise a first portion formed from a first polymeric material and a second portion formed from a second polymeric material. The first portion 72 of the main body casing 12a comprises the outer ring 70 and an outer portion 39 of the nozzle 30a while the second portion 76 of the same comprises the 74 of the connecting means 60b comprises an outer portion 69 of the inner foot 62b and the outer foot 63 while the second portion 78 of the same comprises an inner portion 68 of the foot 62b. The valve 10 may be formed by first injection molding the portions of the valve 10 made from the second polymeric material, except for the end wall, and subsequently injection molding the remaining portions of the valve 10 made from the first polymeric material over the second polymeric material portions. The end wall 22 is then connected to the front end 16 of the lower portion 14 in a manner as described above.

Preferably, the first polymeric material used to form the first portions 72 and 74 of the valve 10 is the same material used to form the fuel tank 50. It is preferred to employ the same polymeric material, in this instance polyethylene, for both in order to insure that a strong weld is made between the connecting means 60b and the fuel tank 50.

The second polymeric material used to form the second portions 76 and 78 of the valve 10 is preferably a heat and fuel resistant polymeric material, such as nylon. While most grades of polyethylene will begin to deform under load at about 180 degrees fahrenheit, most grades of nylon will not begin to deform under load unless placed in an environment having a temperature above 400° F. As a result, the polyethylene first portions 72 and 74 of the valve 20 may be injection molded about the second portions 76 and 78 without the later portions being damaged by heated polyethylene. Further, by employing nylon instead of polyethylene for the second portion 76 of the main body casing 12a, the strength of the connection between the first end 16 of the lower portion 14 and the end wall 22 will be insured even if the temperature in the tank 50 increases.

As shown in FIG. 4, the inner portion 68 of the weld foot 62b is formed as a continuous extension of the lower portion 14a. When the connecting means 60b is welded onto the fuel tank 50, a weld will form between the nylon inner portion 68 of the weld foot 62b and the tank 50. This weld serves to prevent fuel in the tank 50 from reaching the interface 80 between the first and second portions of the valve 10. The weld formed between the inner portion 68 of the weld foot 62b and the tank 50 prevents fuel from reaching the interface 80. It should be noted that if fuel or vapor should happen to reach the interface 80, they will be trapped in the interface or will be vented to the conduit 85.

Figure 5:
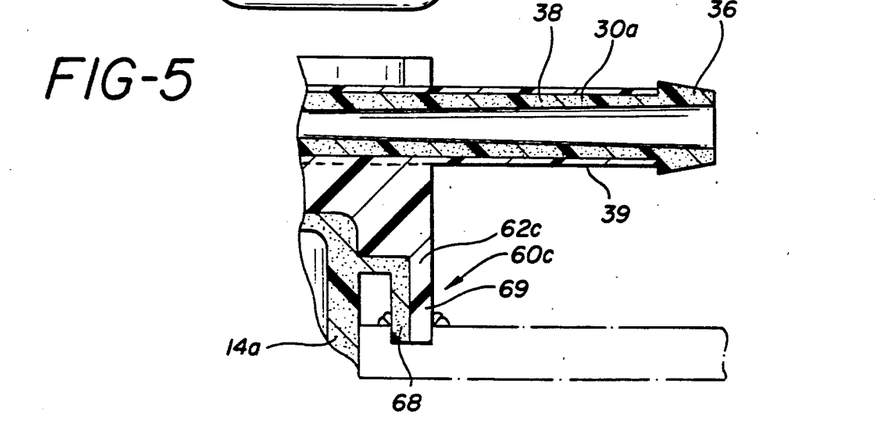
FIG. 5 is a partial side view, in section, of a modification of the second embodiment of the vapor vent valve of the present invention.

A further modification of the second embodiment of the invention is shown in FIG. 5. This modification is similar to the one shown in FIG. 4, except that the connecting means 60c comprises only one weld foot 62c. The outer portion 69 of the weld foot 62c is formed from a first polymeric material and the inner portion 68 of the weld foot 62 is formed from a second polymeric material. For the reasons described above with regard to the embodiment shown in FIG. 4, the first polymeric material is preferably polyethylene and the second polymeric material is preferably nylon. The remaining portions of the valve remain the same as described with respect to the embodiment shown in FIG. 4.

Figure 6:
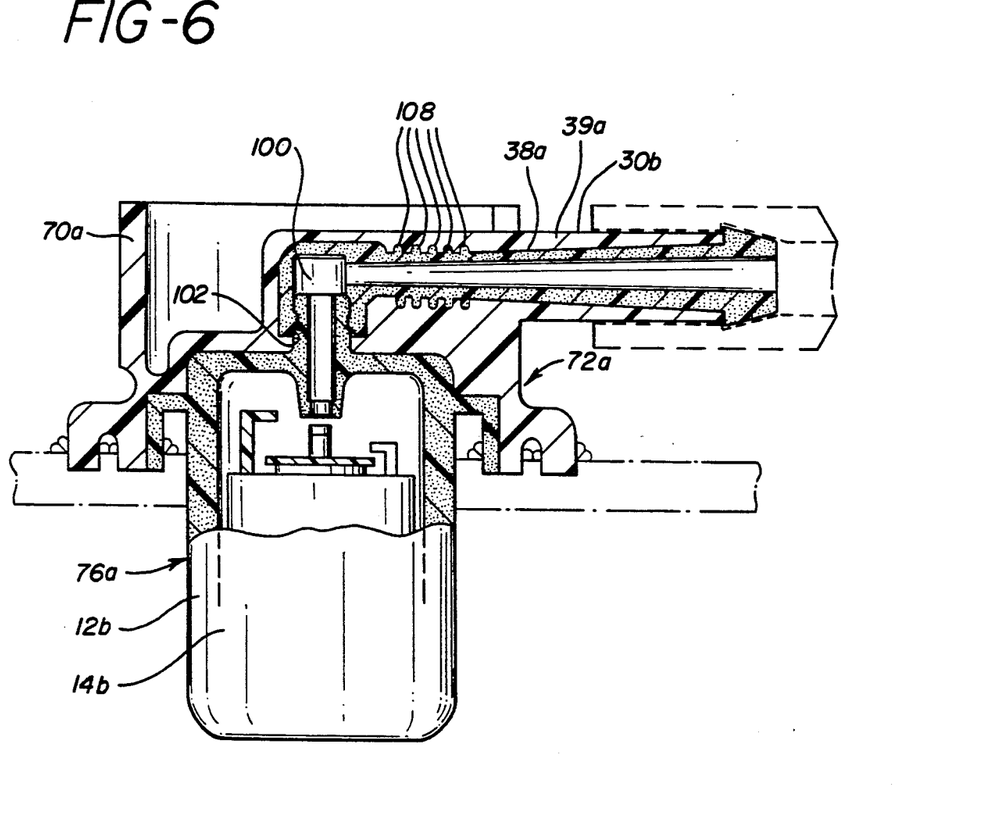
FIG. 6 is a side view, partially in section, of invention.
Figure 7:
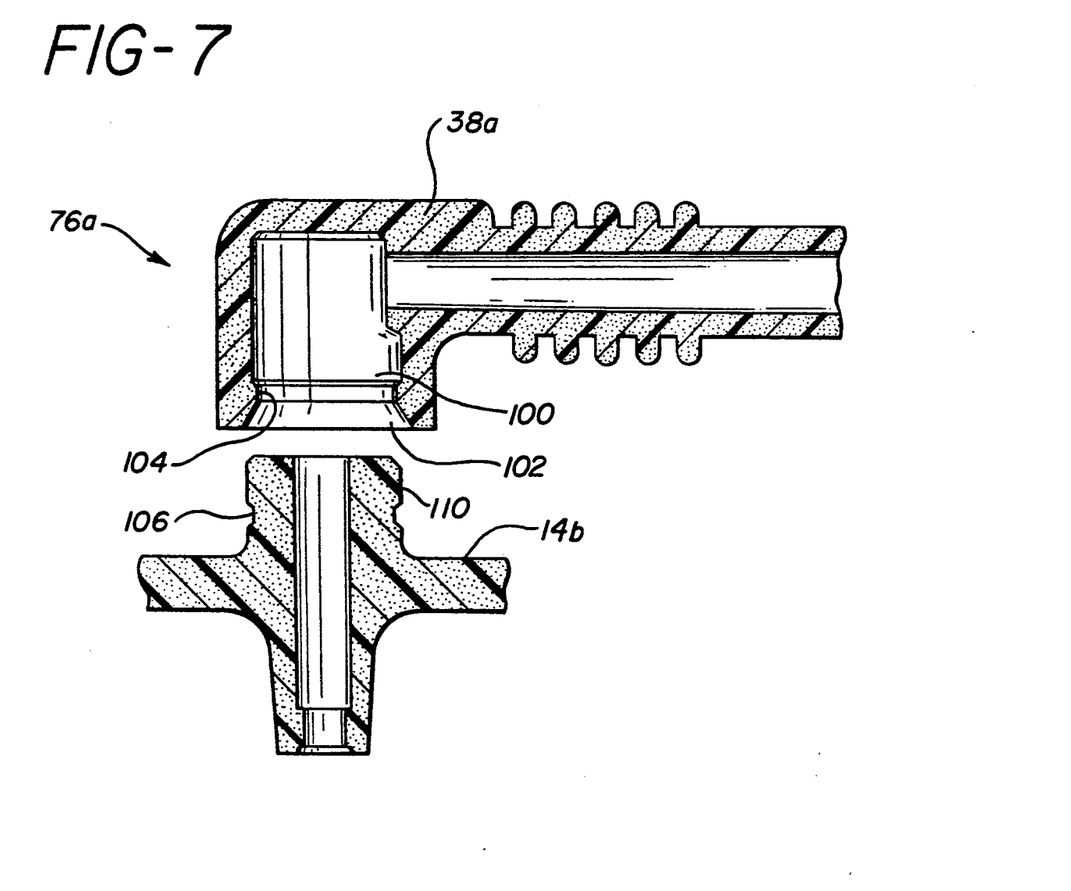
FIG. 7 is an exploded view, in enlarged section of the socket and nipple ends of the third embodiment of the present invention.

A third embodiment of the invention is shown in FIGS. 6 and 7. This embodiment is similar to the one shown in FIG. 4, except that the second portion 76a of the main body casing 12b is made from two separate pieces. Designing the second portion in two pieces may reduce the cost and complexity of the tooling required to manufacture and assembling the vapor vent valve.

Second portion 76a is made by assembling lower portion 14b and inner portion 38a of nozzle 30b. Lower portion 14b and inner portion 38a are made from a heat resistant second polymeric material such as nylon and are attached to one another by a press fit. Socket end 100 of inner portion 38a has a chamfered opening 102. Lower end 100. Projection 104 on socket end 100 mates with circumferential indentation 106 on lower portion 14b. Projection 104 and indentation 106 are sized to partially deform under pressure and provide a fluid tight seal between inner portion 38a and lower portion 14b.

Inner portion 38a and lower portion 14b are preferably made by injection molding. Once assembled, they are used as the core for injection molding outer ring 70a and outer portion 39a from the first polymeric material, preferably high density polyethylene. Upstanding ribs 108 along inner portion 38a receive and contain the first polymeric material therebetween and provide an additional mechanical connection between first portion 72a and second portion 76a. Ribs 108 resist movement or separation between first and second portions 72a, 76a. Ribs 108 also inhibit the passage of fuel between the first and second polymeric materials by providing a convoluted interface having a plurality of sealing surfaces therebetween. The remaining portions of the valve remain the same as described with respect to the embodiment shown in FIG. 4.

While certain representative embodiments and details have been shown for purposes of illustrating the invention, it will be apparent to those skilled in the art that various changes in the device disclosed herein may be made without departing from the scope of the invention, which is defined in the appended claims.

What is claimed is:

1. A vapor vent adapted to be welded directly onto a polymeric fuel tank comprising:
   a main body casing having at least one inlet for communicating with the internal chamber of a polymeric fuel tank an outlet for communicating with a point external to the fuel tank and a passageway which communicates with said inlet and said outlet;
   means located within said casing for controlling fluid flow through said passageway between said inlet and said outlet; and
   polymeric connecting means integral with said main body casing for weldably connecting said casing to said polymeric fuel tank, said connecting means comprises an L-shaped flange which extends out from and encircles said main body casing to defining at least one circumferential weld foot which is substantially parallel to and spaced from said main body casing.

2. A vapor vent valve as claimed in claim 1, wherein said L-shaped flange is bifurcated to define two circumferential weld feet.

3. A vapor vent valve as claimed in claim 1, wherein said at least one weld foot includes an inner portion and an outer portion.

4. A vapor vent valve as claimed in claim 1, wherein said L-shaped flange is bifurcated to define first and second circumferential weld feet, said first weld foot comprising a first outer portion and a second inner portion.

5. A vapor vent valve as claimed in claim 1, wherein said main body casing comprises:
   a substantially cylindrical lower portion having a first end and a second end, said lower Portion having said at least one inlet formed therein and having said connecting mean joined thereto;
   an end wall connected to said first end of said lower portion, said lower portion and said end wall defining an inner cavity for housing said controlling means and said inner cavity defining a first portion of said passageway; and
   a nozzle connected to said second end of said lower portion, said nozzle including an opening therein which extends from a first end of said nozzle to a second outlet and said opening defining a second portion of said passageway.

6. A vapor vent valve as claimed in claim 5, wherein said lower portion of said main body casing, said connecting means, and said nozzle are integrally formed from a first polymeric material.

7. A vapor vent valve as claimed in claim 6, wherein said first polymeric material comprises polyethylene.

8. A vapor vent valve as claimed in claim 5, wherein said nozzle comprises a first inner section defining said opening therein and a second outer section formed around said inner section.

9. A vapor vent valve as claimed in claim 8, wherein said weld foot includes an inner portion and an outer portion.

10. A vapor vent valve as claimed in claim 9, wherein said outer portion of said weld foot and said outer section of said nozzle are formed from a first polymeric material, and said inner portion of said weld foot, said cylindrical lower portion of said main body casing, said end wall, and said inner section of said nozzle are formed from a heat resistant second polymeric material.

11. A vapor vent valve as claimed in claim 10, wherein said first polymeric material comprises polyethylene and said second polymeric material comprises nylon.

12. A vapor vent valve as claimed in claim 8, wherein said L-shaped flange is bifurcated to define first and second circumferential weld feet, said first weld foot comprising a first outer portion and a second inner portion.

13. A vapor vent valve as claimed in claim 12, wherein said outer portion of said first weld foot, said second weld foot, and said outer section of said nozzle are formed from a first polymeric material, and said inner portion of said first weld foot, said cylindrical lower portion of said main body casing, said end wall, eat resistant second polymeric material.

14. A vapor vent valve as claimed in claim 13, wherein said first polymeric material comprises polyethylene and said second polymeric material comprises nylon.

15. A polymeric fuel tank assembly having a weldable vapor vent valve comprising:
   a fuel tank defining an internal chamber for containing fuel and having an outer surface with an opening therein, said fuel tank being formed from a first polymeric material; and
   a vapor vent valve welded onto said outer surface of said fuel tank over said opening, said valve comprising a main body casing having at least one inlet for communicating with said internal chamber of said fuel tank, an outlet for communicating with a point external to said fuel tank and a passageway which communicates with said inlet and said outlet;
   means located within said casing for controlling fluid flow through said passageway between said at least one inlet and said outlet; and
   polymeric connecting means integral with said main body casing for weldably connecting said casing onto said fuel tank, said connecting means comprises an L-shaped flange which extends out from and encircles said main body casing to define at least one circumferential weld foot which is substantially parallel to and spaced from said main body casing.

16. A vapor vent valve as claimed in claim 15, wherein said L-shaped flange is bifurcated to define two circumferential weld feet.

17. A vapor vent valve as claimed in claim 15, wherein said at least one weld foot includes an inner portion and an outer portion.

18. A vapor vent valve as claimed in claim 15, wherein said L-shaped flange is bifurcated to define first and second circumferential weld feet, said first weld foot comprising a first outer portion and second inner portion.

19. A polymeric fuel tank assembly as claimed in claim 15, wherein said main body casing comprises:
   a substantially cylindrical lower portion having a first end and a second end, said lower portion having said at least one inlet formed therein and having said connecting means joined thereto;
   an end wall connected to said first end of said lower portion, said lower portion and said end wall defining an inner cavity for housing said controlling means and said inner cavity defining a first portion of said passageway; and
   a nozzle connected to said second end of said lower portion, said nozzle including an opening therein which extends from a first end of said nozzle to a second end, said second end of said nozzle defining said outlet and said opening defining a second portion of said passageway.

20. A polymeric fuel tank assembly as claimed in claim 15, wherein said vapor vent valve is ultra-sonically welded onto said outer surface of said fuel tank.

21. A polymeric fuel tank assembly as claimed in claim 15, wherein said vapor vent valve is hot-melt welded onto said outer surface of said fuel tank.

22. A vapor vent valve adapted to be connected onto a fuel tank comprising:
   a main body casing having at least one inlet for communicating with the internal chamber of a fuel tank, an outlet for communicating with a point external to the fuel tank and a passageway which communicates with said at least one inlet and said outlet, a first portion of said main body casing being formed from a first polymeric material and a second portion of said main body casing being formed from a second polymeric material;
   means located within said casing for controlling fluid flow through said passageway between said at least one inlet and said outlet; and
   means associated with said main body casing for connecting said casing to said fuel tank.

23. A vapor vent valve as set forth in claim 22, wherein said main body casing comprises:
   a substantially cylindrical lower portion having a first end and a second end, said lower portion having said at least one inlet formed therein and having said connecting mean joined thereto;
   an end wall connected to said first end of sad lower portion, said lower portion and said end wall defining an inner cavity for housing said controlling means and said inner cavity defining a first portion of said passageway; and
   a nozzle connected to said second end of said lower portion comprising a first inner section and a second outer section formed around said inner section, said nozzle including an opening therein defined by said inner section which extends from a first end of said nozzle to a second end thereof, said second end of said nozzle defining said outlet and said opening defining a second portion of said passageway.

24. A vapor vent valve as set forth in claim 23, wherein said first portion of said main body casing comprises said outer section of said nozzle, and said second portion of said main body casing comprises said cylindrical lower portion, said end wall, and said inner portion of said nozzle.

25. A vapor vent valve as set forth in claim 22, wherein said first polymeric material comprises polyethylene and said second polymeric material comprises nylon.

26. A vapor vent valve as set forth in claim 22, wherein said connecting means weldably connects said casing to said fuel tank and is formed from said first polymeric material.

27. A vapor vent valve adapted to be welded directly onto a polymeric fuel tank comprising:
   a main body casing having at least one inlet for communicating with the internal chamber of a polymeric fuel tank, an outlet for communicating with a point external to the fuel tank and a passageway which communicates with said at least one inlet and said outlet;
   means located within said casing for controlling fluid flow through said passageway between said at least one inlet and said outlet; and
   an L-shaped flange connector integral with said main body casing which extends out from and encircles said casing to define one circumferential weld foot for weldably connecting said casing to said polymeric fuel tank, said weld foot being formed from a polymeric material.

28. A vapor vent valve adapted to be welded directly onto a polymeric fuel tank comprising:
a main body casing having at least one inlet for communicating with the internal chamber of a polymeric fuel tank, an outlet for communicating with a point external to the fuel tank and a passageway which communicates with said at least one inlet and said outlet;
means located within said casing for controlling fluid flow through said passageway between said at least one inlet and said outlet; and
a bifurcated L-shaped flange connector integral with said main body casing which extends out from and encircles said casing to define two circumferential weld feet for weldably connecting said casing to said polymeric fuel tank, said two weld feet being formed from a polymeric material.

29. A vapor vent valve adapted to be welded directly onto a polymeric fuel tank comprising:
a main body casing having at least one inlet for communicating with the internal chamber of a polymeric fuel tank, an outlet for communicating with a point external to the fuel tank and a passageway which communicates with said at least one inlet and said outlet;
means located within said casing for controlling fluid flow through said passageway between said at least one inlet and said outlet; and
an L-shaped flange connector which extends out from and encircles said main body casing to define one circumferential weld foot for weldably connecting said casing to said polymeric fuel tank, said weld foot having an outer portion formed from a first polymeric material and an inner portion formed from a second polymeric material.

30. A vapor vent valve adapted to be welded directly onto a polymeric fuel tank comprising:
a main body casing having at least one inlet for communicating with the internal chamber of a polymeric fuel tank, an outlet for communicating with a point external to the fuel tank and a passageway which communicates with said at least one inlet and said outlet;
means located within said casing for controlling fluid flow through said passageway between said at least
a bifurcated L-shaped flange connector which extends out from and encircles said main body casing to define two circumferential weld feet for weldably connecting said casing to said polymeric fuel tank, said first weld foot having a first outer portion formed from a first polymeric material and a second inner portion formed from a second polymeric material.

31. A polymeric fuel tank assembly having a
a fuel tank defining an internal chamber for containing fuel and having an outer surface with an opening therein, said fuel tank being formed from a first polymeric material; and
a vapor vent valve welded onto said outer surface of said fuel tank over said opening, said valve comprising a main body casing having:
a. at least one inlet for communicating with said internal chamber of said fuel tank;
b. an outlet for communicating with a point external to said fuel tank;
c. a passageway which communicates with said inlet and said outlet;
d. a substantially cylindrical lower portion having a first end and a nipple end, said lower portion having said at least one inlet formed therein and having said connecting means joined thereto;
e. an end wall connected to said first end of said lower portion, said lower portion and said end wall defining an inner cavity for housing said controlling means and said inner cavity defining a first portion of said passageway;
f. a nozzle having an inner section, said inner section having a socket end and a second end, said second end defining said outlet, said socket end being connected to said nipple end, said nozzle having an opening extending from said socket end to said second end and defining a second portion of said passageway, said inner section having two or more upstanding ribs positioned between said socket end and said second end, said nozzle including an outer section formed around said inner section;
g. polymeric connecting means integral with said main body casing for weldably connecting said casing onto said fuel tank wherein said connecting means comprises an L-shaped flange which extends out from and encircles said main body casing to define at least one circumferential weld foot wherein said L-shaped flange is bifurcated to define an inner and outer circumferential weld foot, said inner weld foot having an inner portion and an outer portion;
h. means located within said casing for controlling fluid flow through said passageway between said at least one inlet and said outlet; and
said outer weld foot, said outer portion of said inner weld foot and said outer section of said nozzle are formed from said first polymeric material, and said inner portion of said inner weld foot, said cylindrical lower portion of said main body casing, said end wall, and said inner section of said nozzle are formed from a heat resistant second polymeric material.

* * * * *

UNITED STATES PATENT AND TRADEMARK OFFICE
CERTIFICATE OF CORRECTION

PATENT NO. : 5,139,043

DATED : August 18, 1992

INVENTOR(S) : J.P. Hyde and T.J. Bryans

It is certified that error appears in the above-identified patent and that said Letters Patent is hereby corrected as shown below:

```
Col. 9, Line 61 "A vapor vent adapted" should be
--A vapor vent valve adapted--.
Col. 9, Line 65 "fuel tank an outlet" should be
--fuel tank, an outlet--.
Col. 10, Lines 8, 9 "to defining at" should be
--to define at--.
Col. 10, Line 38 "second outlet" should be
--second end thereof, said second end of said nozzle
defining said outlet--.
Col. 11, Lines 6, 7 "wall, eat resistant" should be
--wall, and said inner section of said nozzle are
formed from a heat resistant--.
Col. 12, Lines 67, 68 "weld foot for weldably" should be
--weld foot which is substantially parallel to and
spaced from said main body casing for weldably--.
Col. 13, Lines 48, 49 "least a bifurcated" should be
--least one inlet and said outlet; and a bifurcated--.
Col. 14, Lines 1, 2 "having a a fuel" should be
--having a weldable vapor vent valve comprising: a fuel--.
```

Signed and Sealed this

Fourteenth Day of September, 1993

Attest:

BRUCE LEHMAN

*Attesting Officer*    *Commissioner of Patents and Trademarks*